United States Patent

Campbell et al.

[11] Patent Number: 5,870,455
[45] Date of Patent: Feb. 9, 1999

[54] ENHANCED VOICE SERVICES LOAD BALANCING

[75] Inventors: Jeffrey W. Campbell, Monument; Judy A. Moldenhauer; Allen Holmes, both of Colorado Springs; Phillip D. Crable, Falcon, all of Colo.

[73] Assignee: MCI WORLDCOM, Inc., Ga.

[21] Appl. No.: 701,514

[22] Filed: Aug. 22, 1996

[51] Int. Cl.[6] .................................................. H04M 5/06
[52] U.S. Cl. ...................... 379/88.18; 379/265; 379/309
[58] Field of Search ................................. 379/67, 88, 89, 379/111, 112, 113, 114, 115, 157, 201, 265, 266, 309, 67.1, 88.18, 88.22, 272, 221

[56] References Cited

U.S. PATENT DOCUMENTS

| | | | |
|---|---|---|---|
| 4,319,090 | 3/1982 | Garwood et al. | 379/113 |
| 4,959,854 | 9/1990 | Cave et al. | 379/157 |
| 4,974,256 | 11/1990 | Cyr et al. | 379/113 |
| 5,157,390 | 10/1992 | Yoshie et al. | 340/820.52 |
| 5,161,154 | 11/1992 | Diaz et al. | 370/95.1 |
| 5,189,667 | 2/1993 | Esaki et al. | 370/60 |
| 5,329,579 | 7/1994 | Brunson | 379/88 |
| 5,390,243 | 2/1995 | Casselman et al. | 379/265 |
| 5,530,744 | 6/1996 | Charalambous et al. | 379/265 |
| 5,652,791 | 7/1997 | Sunderman et al. | 379/265 |
| 5,721,923 | 2/1998 | Hamilton | 379/88 |
| 5,734,697 | 3/1998 | Jabbarnezhad | 379/32 |
| 5,787,160 | 7/1998 | Chaney et al. | 379/220 |

*Primary Examiner*—Scott L. Weaver

[57] ABSTRACT

Enhanced voice services (EVS) interactively communicate with a caller so as to provide audio prompting and selection of the final termination of a call. The present improvement includes load balancing, wherein degraded service of audio response units (ARUs) is detected. With load balancing, individual EVS ARU nodes are lumped into groups, where a group is a set of two or more functionally identical EVS audio response units (ARUs) that all support the same EVS customer applications. An inbound call for a given EVS application can be routed, based on a lookup at the data access point (DAP), to any ARU in the group. With the operating level of each ARU in a particular group being known, the percent allocations for each ARU are determined and an update is made at the DAP to route incoming calls to each ARU in the group according to the specified percentages. The load balancing process operates with a set of predefined rules for determining ARU statuses and call allocations, and also has the ability to actually throttle back calls if multiple nodes in an ARU group are degraded.

7 Claims, 4 Drawing Sheets

ENHANCED VOICE SERVICES LOAD BALANCING

FIELD OF THE INVENTION

The present invention relates to telephone networks, and more particularly to a means for distributing incoming calls requiring enhanced voice services.

BACKGROUND OF THE INVENTION

Telephone communication carriers, such as MCI, offer a host of enhanced voice services (EVS) for virtual phone numbers, such as 800 and 900 numbers. Typically, these services enable interactive communication between the caller and the carrier network. Voice services typically involve audio prompting of the caller which narrows down where the call will be routed. For example. a large corporation may involve extensive sales and service phone contacts at disparate geographical locations. By utilizing EVS, the caller may narrow the choice as to where his call should be routed. Responses from the caller are typically phone key entries (DTMF) or voice responses. The heart of the EVS network platform is an audio response unit (ARU) that provides specified voice prompts, that are stored on large hard drives, and typically customized for particular 800 or 900 number network customers.

An EVS system, as currently employed in the MCI network, is illustrated in FIG. 1 (prior art). In a typical scenario, a caller at phone 10 places an 800 number call which is routed, via link 12, to an MCI switch 14. The switch queries (along link 16), an available data access point (DAP) 18 which determines further routing of the call, based upon the 800 number dialed by the caller.

Once the routing for a call has been determnined to be for EVS, it is passed through the appropriate MCI switches 36 to the designated audio response unit (ARU) node 32,34. As will be observed in FIG. 1, each of the ARUs is connected with a respective switch 36, 38 and interconnected lines 40, 42, 44 and 46 that are connected as redundant pairs. Thus, if a particular ARU becomes seriously degraded, the audio response tasks may be switched to the other ARU in the pair from either switch. Each ARU includes a processor loaded with the same application scripts that define, by the initial incoming 800 number called and the DAP lookup, which audio files stored at the ARU are to be activated so as to complete a predefined interactive process with the caller.

From a call routing standpoint, failure of an ARU causes two things to happen: First, the EVS switch of the faulty ARU reroutes all incoming traffic to the partner ARU via a cross link 44, 46. Second, the EVS Audio Management System (AMS) 26 detects that an ARU is down and sends a failover message to the Data Access Point (DAP) to reroute any further calls to the faulty ARU's partner. This second mechanism results in reroutes at the initial DAP lookup.

The failover message from the AMS is sent to the DAP via the Service Control Manager (SCM) 22. However, each ARU can still not be allowed to run much higher than 50% of capacity under the current architecture in case it must suddenly receive calls originally intended for its failed partner.

BRIEF DESCRIPTION OF THE PRESENT INVENTION

The primary objective of EVS load balancing is to increase ARU efficiency, thereby reducing the number of additional ARUs needed to meet the increasing demand for EVS products. This can be achieved by allocating incoming EVS calls through a load distributor balancing function with organic stress and failover rerouting capabilities thereby allowing each ARU to run at a higher percentage of its capacity. This load balancing function would theoretically distribute a call volume that would fill N ARU nodes over a total of N+1 nodes, which would then permit each node to run at least at N/(N+1) of its total capacity.

As a minimum, the load balancing function is required to do the following:

Load Balancing. Incoming EVS calls should be routed to a pool of two or more ARUs supporting the requested EVS application.

Stress Support. Inbound call routing should be configurable on a real time basis to reduce the number of calls allocated to an ARU in a stress condition.

Failover Support. Inbound call routing should be configurable on a real time basis to not route calls to a failed ARU.

Transparency. This functionality shall be transparent to EVS customers and to network routing plans.

Default Support. In the event load balancing fails, the DAP shall still be able to designate a functioning ARU to which the call may be routed.

Backwards Compatibility. Load balancing should not require rebuilding or reprovisioning existing EVS applications.

The increase of ARU efficiency through load balancing has implications for how EVS applications are distributed on the nodes. Understanding these implications requires use of the concept of an ARU "group," where an ARU group is defined as a set of functionally identical ARU nodes which all support the same EVS applications. The key characteristic of a group is that an inbound call destined for an application supported by an ARU group could be routed to any ARU in that group. This leads to a basic relationship between load balancing and ARU efficiency. An increase in group size allows each ARU in the group to run at higher efficiency. For example, with the current group size of 2 ARUs, each ARU in the group can theoretically only run at 50% of capacity, so that it can handle its partner's calls if that partner ARU fails (in practice, the ARUs are actually allowed to run at higher than 50% of capacity). If the group size were increased to 3 ARUs, each ARU in the group could then run at 66% of capacity.

ARU efficiency could also be improved by eliminating the concept of predefined ARU groups, such that EVS applications could be deployed to any combination of ARUs. For example, an application A would be deployed on ARUs 1, 2, & 4, while application B would be deployed to ARUs 1, 4, and 6. Using this approach, each ARU could run at higher efficiency because the effects of the loss of any given ARU would be spread among several other ARUs. This "open deployment" approach theoretically results in greater efficiency than using the ARU "group" architecture discussed above, but is significantly more difficult to provision and manage, and may or may not be actually implemented in the initial phase of EVS load balancing.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 2:
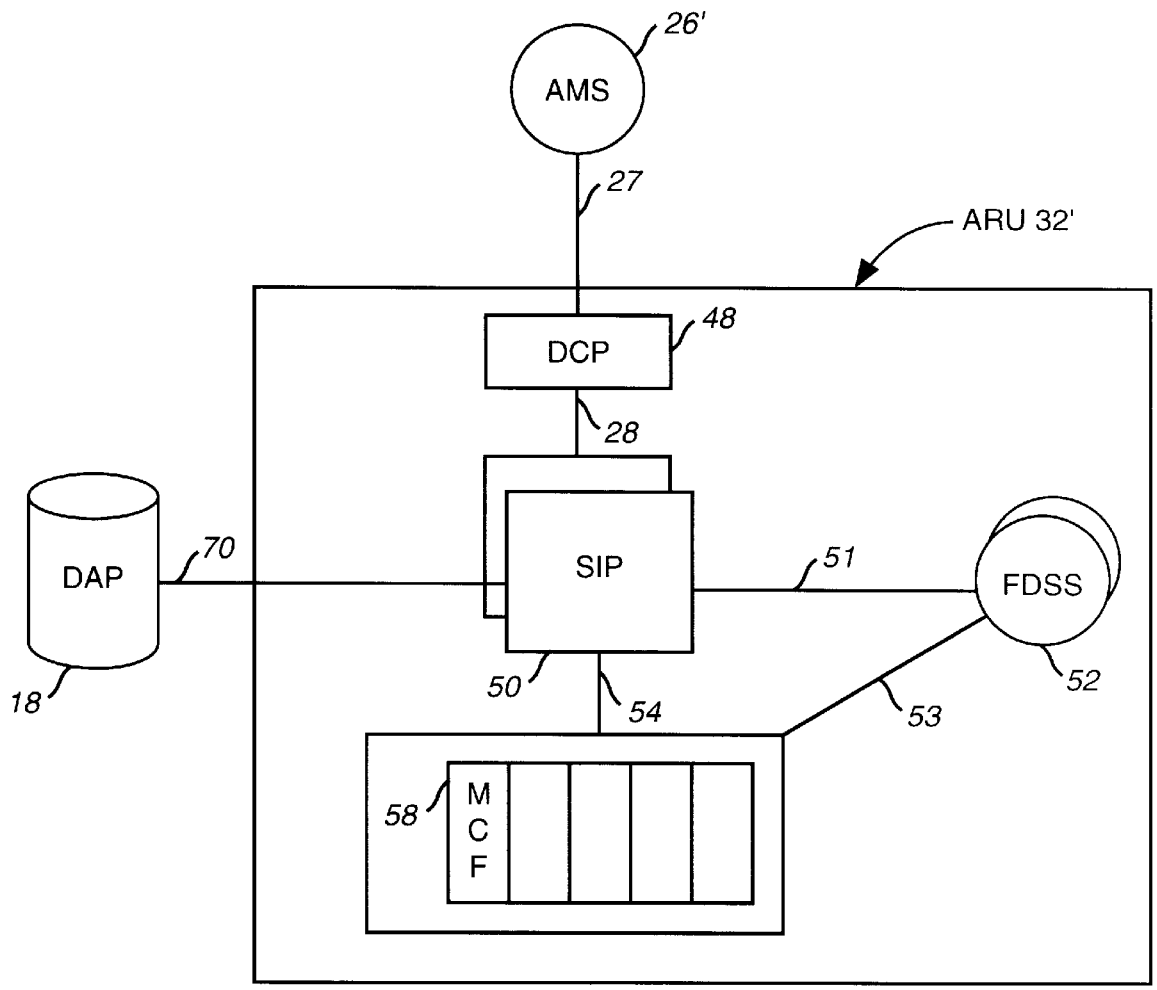
FIG. 2 is a block diagram of an EVS system, and more particularly, a novel audio response unit that permits load balancing, in accordance with the present invention.

FIG. 2 illustrates the portions of an EVS system which accomplish load balancing. An AMS 26 determines the traffic percent allocation of nodes (ARUs) in a group. In FIG. 2, a single ARU 32 within a particular group is illustrated. The ARU 32 is provided by Precision Systems Incorporated (PSi) of St. Petersburg, Fla. AMS 26 is linked, via 27, to the ARU 32. In particular, a key process involved in load balancing is the decision control process (DCP) 48. The purpose of the DCP is to make a determination of the operational level of an ARU based on statuses of the ARU's internal devices. Any change in operating level is then reported to the AMS 26 by the DCP 48, thereby allowing the AMS to reassign inbound call percentages to the nodes (ARUs) in the group. The DCP 48 determines the operating level of the ARU based on its individual device (e.g., SIP, MCF) statuses. An operating level of 1 indicates full capability. A level of 2 indicates partial degradation, while an operating level of 3 is indicative of significant degradation requiring incoming call load reduction.

The ARU internal devices monitored by the DCP for determination of the ARU operating level are two script interpreter processes (SIPs) 50, two fast disk subsystems (FDSSs) 52, and eight master control frames (MCFs) 58. The SIPs interpret and execute the instructions of the EVS applications which run on the ARU. The FDSSs store the digitized audio files (greetings, messages, etc) used by the EVS applications. The MCFs house the digital signal processor (DSP) cards which contain the voice ports that link the ARU with the telephony network. As an EVS application runs, the SIP (via link 51) instructs the FDSS to provide the required audio files to the appropriate voice port on the MCF (via link 53). The DCP also monitors the external links to the DAPs (link 70), which allow the ARU to query the DAPs for call extension routing information.

The load balancing operation will now be discussed. The DCP of the ARU determines the operating level of the ARU based on the statuses of the ARU's devices and a defined ruleset. The operating level of an ARU is sent by the DCP to the AMS, which then determines the percentages of calls that will be directed to that ARU by the DAP.

The ARU operating levels will be defined as follows:
Level 1 Capable (Most or all of its devices are reporting an Up status. ARU is able to handle its current load. The ARU may be capable of handling an additional load, if needed)
Level 2 Partially Capable (Some of the ARU devices are reporting a DOWN status, ARU is still able to handle its current load)
Level 3 Limited Capability (The ARU's operating capability is severely hindered, ARU needs to have some traffic diverted away from the node)

The ARU monitors the status of the following device types:
(1) 2 FDSSs 52
(2) 2 SIPs 50
(3) 6 DAP links 70
(4) 8 MCFs 58

With this approach, the ARU will be required to evaluate its overall operating level whenever a state change is received from one or more of its devices. If the operating level changes, the ARU will forward the new operating level to the AMS. The AMS will store the operating level information for all EVS ARUs. Based on this information, the AMS will determine if percent allocation adjustments are needed for the ARU group. The AMS will only store the operating level of an ARU with an overall status of UP. If an ARU in a group has a DOWN status, the AMS will set the operating level to DOWN.

The steps to determine the appropriate percent allocations of calls to ARUs in a group are described below:

Step 1: The ARU will evaluate the individual operating level of each of its device types based on the Up/Down Status of its devices as determined by the DCP.

Note: The operating levels assigned for the various device types below are an example. Each of these operating level assignments are configurable. These assignments are entered and stored in a table on each ARU. A restricted access (password-protected), user interface is provided for entry of this data on the ARU. It is intended that one table of operating level assignments would be established for each configuration of an EVS ARU.

FDSS 52
If 2 of the 2 FDSSs are UP: the operating level of the FDSS=1
If 1 of the 2 FDSSs are UP: the operating level of the FDSS=2
If 0 of the 2 FDSSs are UP: the ARU overall status is DOWN SIP 50
If 2 of the 2 SIPs are UP: the operating level of the SIP=1
If 1 of the 2 SIPs are UP: the operating level of the SIP=3
If 0 of the 2 SIPs are UP: the ARU overall status is DOWN DAP Links
If 6 of the 6 DAP links are UP: the operating level of the DAP links=1
If 5 of the 6 DAP links are UP: the operating level of the DAP links=1
If 4 of the 6 DAP links are UP: the operating level of the DAP links=2
If 3 of the 6 DAP links are UP: the operating level of the DAP links=2
If 2 of the 6 DAP links are UP: the operating level of the DAP links=3
If 1 of the 6 DAP links are UP: the operating level of the DAP links=3*
If 0 of the 6 DAP links are UP: the ARU overall status is set to DOWN

*The ruleset defined for the ARU DCP determines when the parent state for the various device types will be set to DOWN; thus causing the overall ARU operating level and status to be set to DOWN.

MCFs 58
If 8 of the 8 MCFs are UP: the operating level of the MCFs=1
If 7 of the 8 MCFs are UP: the operating level of the MCFs=1
If 6 of the 8 MCFs are UP: the operating level of the MCFs=1
If 5 of the 8 MCFs are UP: the operating level of the MCFs=2
If 4 of the 8 MCFs are UP: the operating level of the MCFs=2
If 3 of the 8 MCFs are UP: the operating level of the MCFs=3
If 2 of the 8 MCFs are UP: the operating level of the MCFs=3
If 1 of the 8 MCFs are UP: the operating level of the MCFs=3**
If 0 of the 8 MCFs are UP: the ARU overall status is set to DOWN Step 2: The ARU evaluates its overall ARU operating level. The overall ARU operating level is determined based on the worst level reported of the individual device types.

For example, if an ARU's FDSS operating level is 1, the SIP level is 1, the DAP level is 2 and the MCFs level is 3, the overall ARU operating level would be 3 (the worst level reported by a device type). The operating level is forwarded from the ARU to the AMS. In cases where the ARU is unable to forward its operating level to the AMS, the lack of a periodic heartbeat between the AMS and the ARU indicates the problem, and the AMS itself assigns an operating level of DOWN to that ARU.

Step 3: Using the same method as described in Steps 1 and 2, each EVS ARU in the group would evaluate and store their operating level. Initially, all EVS ARUs will need to evaluate and forward their operating level to the AMS. Afterwards, an ARU will only re-evaluate its operating level when a state change occurs. If the ARU's operating level changes, the ARU will forward the new operating level to the AMS.

Step 4: Once the operating levels of all ARUs in a group are stored/retrieved, the AMS will determine if the current time is in the defined period for peak or off-peak hours. Two sets of Percent Allocation tables will be defined and stored on the AMS as presently discussed in connection with Tables 1–6. One set will contain the percent allocations for ARU groups of operational ARUs for peak hours and the second set will contain the percent allocations for ARU groups of operational ARUs for off-peak hours. The difference between these two sets of tables is that the off-peak hours tables will not throttle back calls. This is based on the assumption that during off-peak hours, the traffic is so low that even a group of degraded devices can accommodate 100% of the reduced traffic load.

Step 5: The AMS will do a lookup in the Percent Allocation table that corresponds to the peak or off-peak hours and the number of operational ARUs in the group. The percent allocations should be static, but configurable. The AMS will not need to dynamically calculate the percentages, the percent allocation tables will contain them. These percent allocation tables will be stored on the AMS. A user interface on the AMS is provided for the data entry and editing of the data in the percent allocation tables.

Note: If an ARU goes DOWN in a group, the AMS should retrieve the operating level of the operational (Up) ARUs in the group and use the appropriate table for the number of operating ARUs and peak/off-peak hours to establish the percent allocations. For example, if there are three ARUs in a group, A, B, and C with each allocated 33%, 33% and 34% respectively and ARU A goes DOWN, then the AMS will retrieve the operating level of ARUs B and C and then look in the two Operational ARUs in a Group table to determine the percent allocation. When ARU A comes back UP, the AMS will again use the values in the 3 Operational ARUs in a Group table to determine the appropriate percentages.

Below are sample Percent Allocation tables based on the operating levels of the ARUs in a group.

TABLE 1

Sample ARU Percent Allocations for Three Operational ARUs in a Group (Peak Hours)

| ARU A Operating Level | ARU B Operating Level | ARU C Operating Level | ARU A Percent Allocation | ARU B Percent Allocation | ARU C Percent Allocation |
|---|---|---|---|---|---|
| 1 | 1 | 1 | 33 | 33 | 34 |
| 1 | 1 | 2 | 33 | 33 | 34 |
| 1 | 1 | 3 | 40 | 40 | 20 |
| 1 | 2 | 2 | 33 | 33 | 34 |
| 1 | 2 | 3 | 42 | 33 | 25 |
| 1 | 3 | 3 | 50 | 25 | 25 |
| 2 | 2 | 2 | 33 | 33 | 34 |
| 2 | 2 | 3 | 37 | 38 | 25 |
| 2 | 3 | 3 | 40 | 25 | 25 |
| 3 | 3 | 3 | 25 | 25 | 25 |

Not all allocated percentages add up to 100% in the peak hours tables. The unallocated percentage of calls will be throttled back by the DAP due to the operating conditions of the ARUs in the group.

TABLE 2

Sample ARU Percent Allocations for Two Operational ARUs in a Group (Peak Hours)

| ARU A Operating Level | ARU B Operating Level | ARU A Percent Allocation | ARU B Percent Allocation |
|---|---|---|---|
| 1 | 1 | 50 | 50 |
| 1 | 2 | 50 | 50 |
| 1 | 3 | 65 | 35 |
| 2 | 2 | 50 | 50 |
| 2 | 3 | 60 | 25 |
| 3 | 3 | 37 | 38 |

TABLE 3

Sample ARU Percent Allocations for One Operational ARU in a Group (Peak Hours)

| ARU A Operating Level | ARU A Percent Allocation |
|---|---|
| 1 | 100 |
| 2 | 100 |
| 3 | 75 |

TABLE 4

Sample ARU Percent Allocations for Three Operational ARUs in a Group (Off-Peak Hours)

| ARU A Operating Level | ARU B Operating Level | ARU C Operating Level | ARU A Percent Allocation | ARU B Percent Allocation | ARU C Percent Allocation |
|---|---|---|---|---|---|
| 1 | 1 | 1 | 33 | 33 | 34 |
| 1 | 1 | 2 | 33 | 33 | 34 |
| 1 | 1 | 3 | 40 | 40 | 20 |
| 1 | 2 | 2 | 33 | 33 | 34 |
| 1 | 2 | 3 | 42 | 33 | 25 |
| 1 | 3 | 3 | 50 | 25 | 25 |
| 2 | 2 | 2 | 33 | 33 | 34 |
| 2 | 2 | 3 | 37 | 38 | 25 |
| 2 | 3 | 3 | 40 | 30 | 30 |
| 3 | 3 | 3 | 33 | 33 | 34 |

All allocated percentages add up to 100% in the off-peak hours tables. During off-peak hours with low call volumes no calls will be throttled back by the DAP.

TABLE 5

Sample ARU Percent Allocations for Two
Operational ARUs in a Group
(Off-Peak Hours)

| ARU A Operating Level | ARU B Operating Level | ARU A Percent Allocation | ARU B Percent Allocation |
|---|---|---|---|
| 1 | 1 | 50 | 50 |
| 1 | 2 | 50 | 50 |
| 1 | 3 | 65 | 35 |
| 2 | 2 | 50 | 50 |
| 2 | 3 | 65 | 35 |
| 3 | 3 | 50 | 50 |

TABLE 6

Sample ARU Percent Allocations for One
Operational ARU in a Group
(Off-Peak Hours)

| ARU A Operating Level | ARU A Percent Allocation |
|---|---|
| 1 | 100 |
| 2 | 100 |
| 3 | 100 |

Step 6: If the table lookup determines that the percent allocation has not changed from the current, no updates are sent to the DAP. If the percent allocation is different from the current, the AMS will generate the appropriate record update to the DAP for that ARU group.

Step 7: When the current time at the AMS changes from peak hours to off-peak hours or vice versa, the AMS will re-evaluate, and possibly adjust, the percent allocations for all ARU Groups.

Flowcharts

Figure 1:
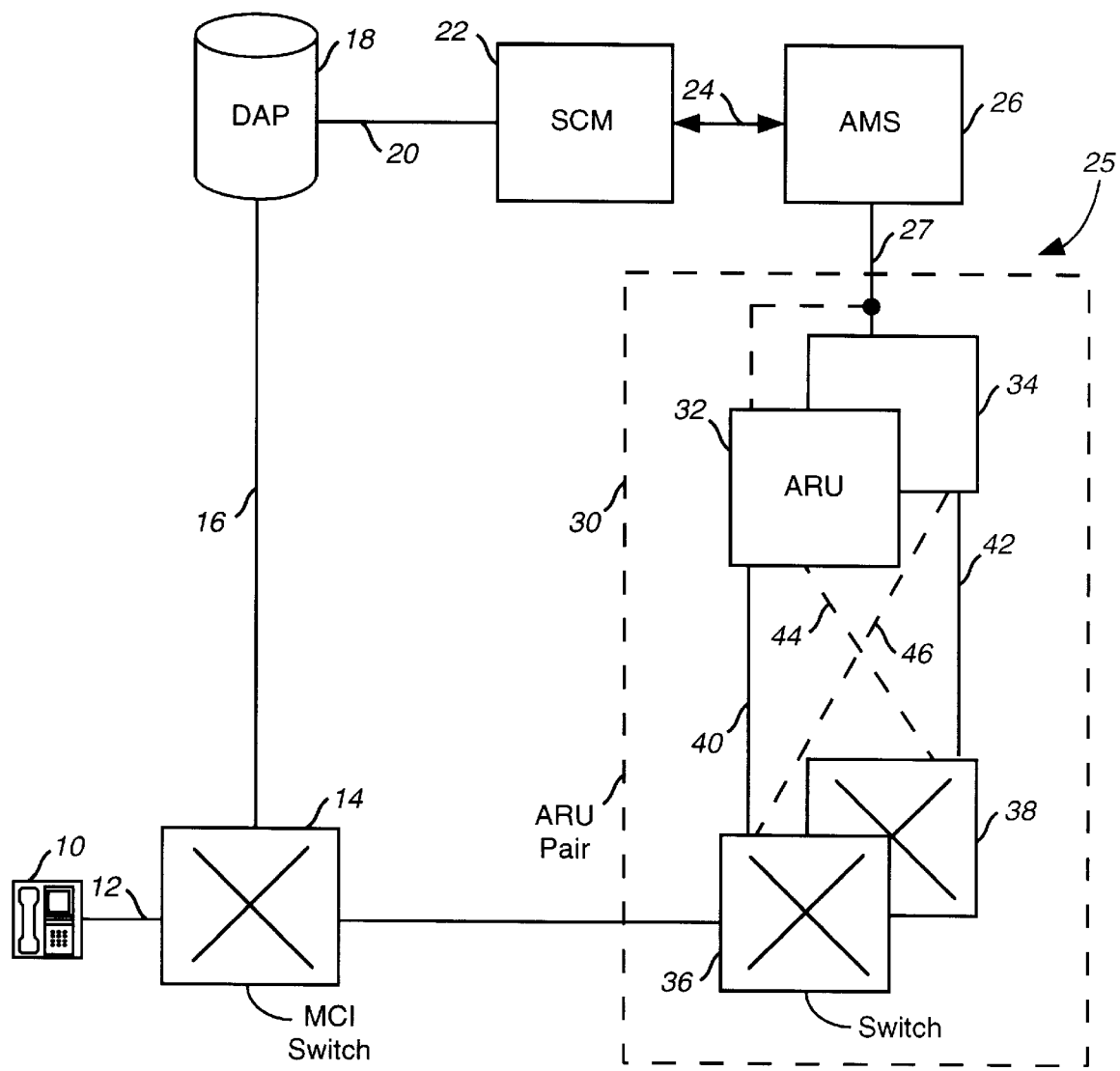
FIG. 1 is a block diagram of a prior art EVS system.
Figure 3:
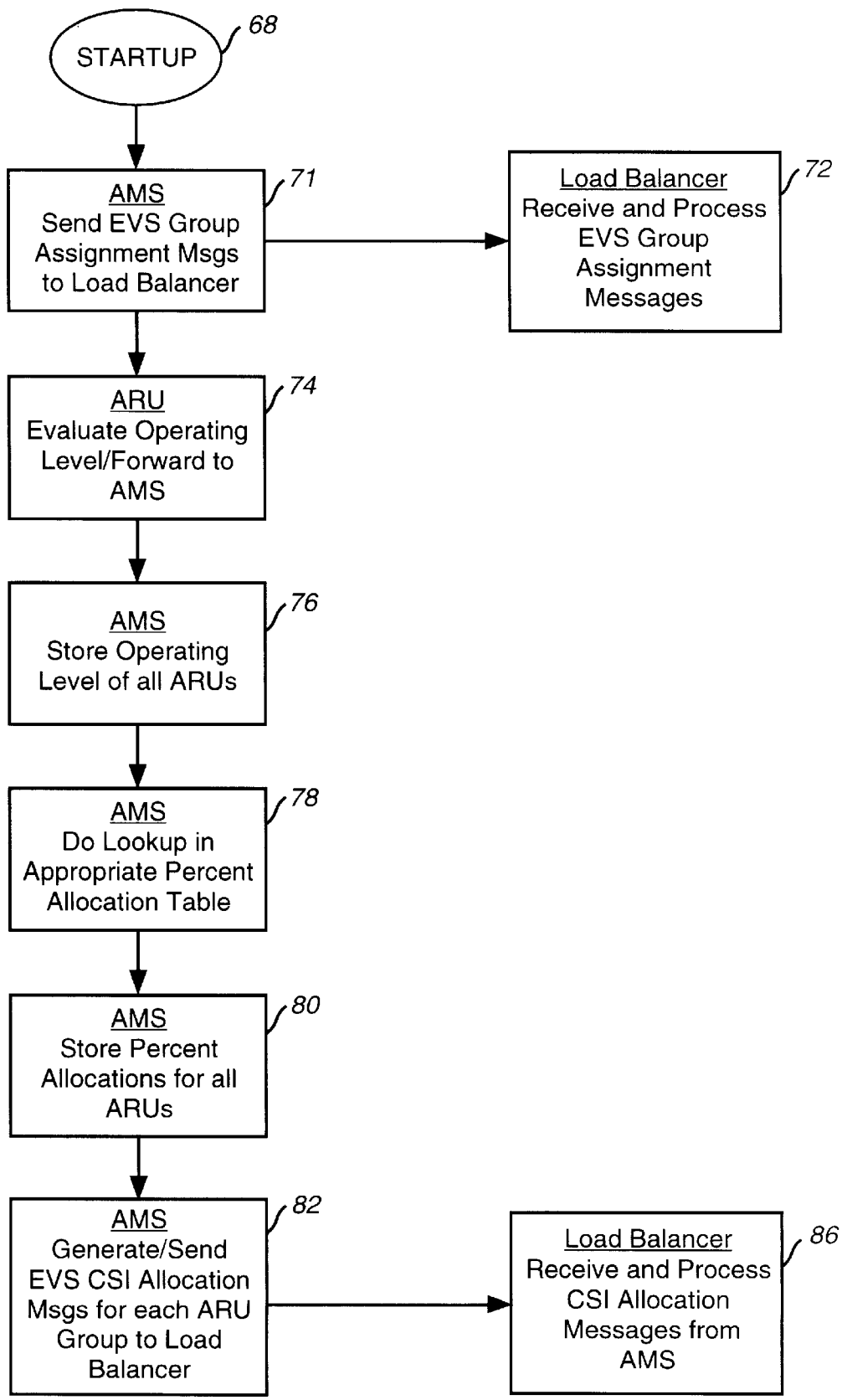
FIG. 3 is a flowchart indicating the process for load balancing at startup.

FIG. 3 is a simplified flowchart which indicates a start up condition for the load balancing process of the present invention. The basic purpose of the flowchart is to populate tables, stored in the DAP 18 (FIG. 1) which serves as a load balancer. After the initial start up step 68, the AMS 26 will need to keep track of which ARU group each particular ARU is assigned to, and will need to use this knowledge to produce an EVS Group Assignment message that will be passed to the DAP 18, via the SCM 22. For the initial implementation of load balancing, the EVS Group Assignment message consists of a customer service ID (CSI) number which maps to an ARU group ID. During step 72, the load balancer (DAP 18) receives and processes the EVS Group Assignment messages. After the EVS Group Assignment messages have been sent to the load balancer (DAP 18) at step 71, the load balancer is not in a position to distribute calls to the group until further operational data is received back from the group. To accomplish this, step 74 is initiated wherein the ARUs, such as 32 (FIG. 2) evaluate their respective operating level and forward this information to the AMS 26. The subsequent step 76 achieves the storage of operating levels of all ARUs in the AMS.

During step 78, the AMS does a look-up, in the appropriate percentage allocation table, and subsequently stores the appropriate percentage allocations for all ARUs (step 80). Step 82 then ensues wherein the AMS generates and transmits EVS CSI allocation messages for each ARU group to the load balancer (DAP) via the SCM. The load balancer (DAP 18) receives and processes the CSI allocation messages from the AMS during step 86, at which point the load balancer is capable of distributing incoming call load under most current operating conditions of the ARUs.

Figure 4:
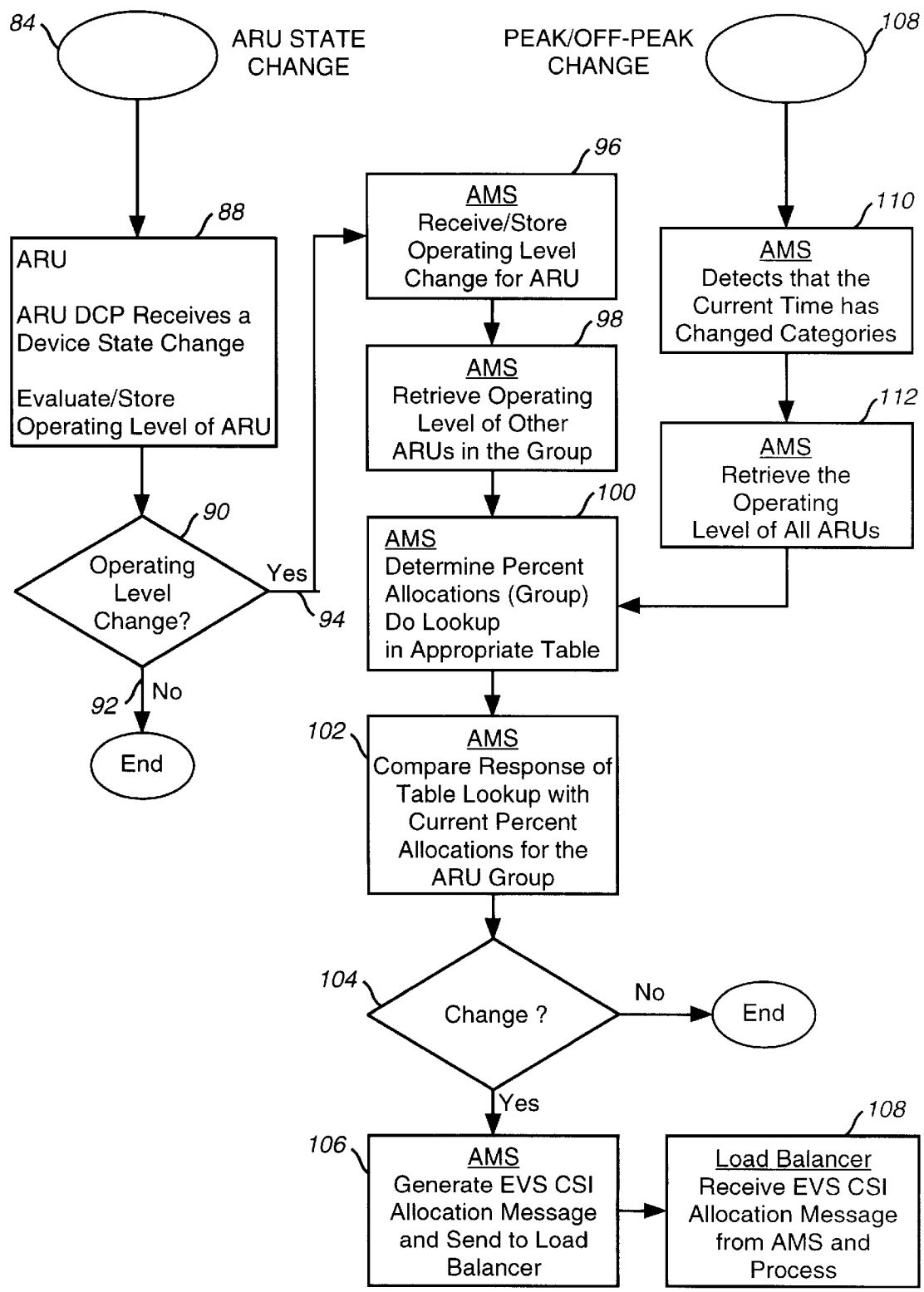
FIG. 4 is a flow diagram illustrating load balancing as employed in connection with the present invention during normal operation.

FIG. 4 is a flowchart indicating operation of load balancing on the AMS when changes occur in operating level of an ARU.

Step 84 assumes that a state change has occurred in an ARU. Viewing FIG. 2, this could include an alarm message received from the devices within ARU 32. Step 88 shows that DCP 48 (FIG. 2) receives the message indicating device state change and the DCP evaluates and stores the resulting operating level of the ARU, based on the evaluated degradation or recovery of the ARU 32.

In FIG. 4, decisional step 90 determines whether an operating level change has occurred. In the event that no change occurs, branch 92 ends the process and no modifications are made to the current call percent allocations. On the other hand, if an operating level change is detected, the process branches to 94, where step 96 results in receiving and storing the operational level change for the affected ARU—by the AMS. Step 98 subsequently follows wherein the AMS retrieves the operating level of the other ARUs in the group. The AMS, during step 100, determines the percentage allocations (Group) by performing a lookup in the appropriate percent allocation tables. Sample percentage allocation tables, based on the ARU's operating level, appear above.

In step 102, the AMS compares the response of the table lookup to the current operating percent allocations for the affected ARU group. Decisional step 104 determines whether a change has occurred. If no change has occurred, the process is ended and no modifications are made to the current call percent allocations. If a change has occurred, the process branches to step 106 wherein the AMS generates an EVS CSI allocation message that is sent to the load balancer (DAP 18) via the SCM. The reader is reminded that the load balancer refers to that portion of the DAP 18 which performs allocation of incoming call load.

The load balancer receives an EVS CSI allocation message from the AMS and processes the message so that updating may occur.

Another type of change, affecting the process in FIG. 4, is the change of current time resulting in changed categories—peak/off peak. When a system clock, at step 109, determines the change of time category, the AMS detects this at step 110. Thereafter, the AMS retrieves the operating level of all ARUs. The process then branches to step 100 wherein a new determination of percentage allocations for a group are made based on the new time category.

As will be appreciated from the aforementioned description of the invention, a system is made available for redistributing inbound call load to various ARUs in a group so as to achieve a more balanced load.

It should be understood that the invention is not limited to the exact details of construction shown and described herein for obvious modifications will occur to persons skilled in the art.

We claim:

1. A method for continually load balancing inbound phone calls to a telephone network enhanced voice system (EVS) platform, having a plurality of audio response units (ARUs) associated with a group, the EVS platform including a number of such groups, the method comprising the steps:

detecting a degradation in operating level within an ARU of a related group;

evaluating the level of operation of the ARU as a result of the detecting;

retrieving the operating levels of the other ARUs in the same group;

establishing changed inbound call allocation, to all ARUs of the group, in accordance with a prestored table, and a function of the operating levels of the ARUs in the group;

generating a customer service identification (CSI) allocation message, indicative of the changed allocation;

transmitting the CSI allocation message to a data access point (DAP), via a service control manager (SCM), in the network; and load balancing further inbound calls to the group, in accordance with allocation percentages in the CSI allocation message.

2. The method set forth in claim 1 further comprising the step of determining, prior to establishing changed inbound call allocation, if a change in allocation is necessary relative to a current allocation, as dictated by the prestored table; and generating the CSI allocation message if a change is required.

3. The method set forth in claim 1 further comprising the preliminary startup steps of:

transmitting a message to the DAP, via the SCM, comprising group assignments for all EVS ARUs;

evaluating the level of operation of the ARUs of the group during startup;

storing percent allocations for all ARUs, in accordance with a prestored table, and a function of the operating levels of the ARUs in the group;

generating a initial CSI allocation message, indicative of the percent allocations;

transmitting the initial CSI allocation message to the DAP via the SCM; and load balancing initial inbound calls to the group, in accordance with allocation percentages in the initial CSI allocation message.

4. In a telephone network including a data access point (DAP) for routing inbound calls to an enhanced voice system (EVS) platform having a plurality of audio response units (ARUs) associated with a group, the EVS platform including a number of such groups, a method for continually load balancing inbound phone calls to the EVS platform, comprising the steps:

detecting a degradation in operating level within an ARU of a related group;

evaluating the level of operation of the ARU as a result of the detecting;

retrieving the operating levels of the other ARUs in the same group;

establishing changed inbound call allocation, to all ARUs of the group, in accordance with a prestored table, and a function of the operating levels of the ARUs in the group;

generating a customer service identification (CSI) allocation message, indicative of the changed allocation;

transmitting the message to the DAP in the network; and load balancing further inbound calls to the group, in accordance with allocation percentages in the CSI allocation message.

5. In a telephone network including a data access point (DAP) for routing inbound calls to an enhanced voice system (EVS) platform having a plurality of audio response units (ARUs) associated with a group, the EVS platform including a number of such groups, a method for continually load balancing inbound phone calls to the EVS platform, comprising the steps:

entering a startup phase including (a) transmitting a message to a data access point (DAP) including group assignments for all EVS ARUs;

(b) evaluating the level of operation of the ARUs of the group during startup;

(c) storing percent allocations for all ARUs, in accordance with a prestored table, and a function of the operating levels of the ARUs in the group;

(d) generating a customer service identification (CSI) allocation message, indicative of the percent allocations;

(e) transmitting the CSI allocation message to the DAP; and (f) load balancing initial inbound calls to the group, in accordance with CSI allocation percentages in the allocation message;

continuing with an operational phase including (g) detecting a degradation in operating level within an ARU of a related group;

(h) evaluating the level of operation of the ARU as a result of the step (g);

(i) retrieving the operating levels of the other ARUs in the same group;

(j) using a prestored table, establishing whether a change in inbound call allocation to the ARUs of the group is required, and if so, proceeding to step (k);

(k) generating a second CSI allocation message, indicative of the changed allocation;

(l) transmitting the second CSI allocation message to the DAP, via a service control manager (SCM), in the network; and (m) load balancing further inbound calls to the group, in accordance with allocation percentages in the second CSI allocation message.

6. The method set forth in claim 5 wherein the DAP is located remotely of the ARUs.

7. The method set forth in claim 5 wherein steps (a)–(e) and (g)–(l) are performed by a single audio management system (AMS), connected to all EVS ARUs.

* * * * *